(12) United States Patent
Boscolo Berto et al.

(10) Patent No.: US 12,387,756 B2
(45) Date of Patent: Aug. 12, 2025

(54) METHOD OF OPERATING A VOICE COIL MOTOR AND CORRESPONDING CONTROL CIRCUIT

(71) Applicant: STMicroelectronics International N.V., Geneva (CH)

(72) Inventors: Michele Boscolo Berto, Milan (IT); Ezio Galbiati, Agnadello (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/417,588

(22) Filed: Jan. 19, 2024

(65) Prior Publication Data
US 2024/0265940 A1 Aug. 8, 2024

(30) Foreign Application Priority Data
Feb. 6, 2023 (IT) .......................... 102023000001830

(51) Int. Cl.
*G11B 19/20* (2006.01)
*G11B 5/55* (2006.01)
*H02P 7/025* (2016.01)

(52) U.S. Cl.
CPC ........ *G11B 19/2009* (2013.01); *G11B 5/5569* (2013.01); *H02P 7/025* (2016.02)

(58) Field of Classification Search
None
See application file for complete search history.

(56) References Cited

U.S. PATENT DOCUMENTS

| | | | | |
|---|---|---|---|---|
| 4,786,993 | A | * | 11/1988 | Jove .......................... G11B 5/02 |
| 5,191,297 | A | * | 3/1993 | Penman ................ H03F 1/3217 |
| | | | | 360/78.12 |
| 5,412,309 | A | * | 5/1995 | Ueunten .................. G05F 3/267 |
| | | | | 330/253 |
| 5,426,545 | A | * | 6/1995 | Sidman .............. G11B 5/59694 |
| | | | | 360/78.04 |
| 5,530,399 | A | * | 6/1996 | Chambers ................. G06J 1/00 |
| | | | | 330/252 |

(Continued)

FOREIGN PATENT DOCUMENTS

| | | |
|---|---|---|
| EP | 1863164 A1 | 12/2007 |
| JP | 3939971 B2 | 7/2007 |
| JP | 7204375 B2 | 1/2023 |

OTHER PUBLICATIONS

STMicroelectronics, "Extract from the Datasheet of THOR Power Combo," Seagate Confidential, Rev 2.1.4, May 7, 2021, 1 page.

*Primary Examiner* — Fred Tzeng
(74) *Attorney, Agent, or Firm* — Slater Matsil, LLP (57) ABSTRACT

Embodiments provide a method of operating a voice coil motor via a transconductance loop. The method includes detecting an actual value of a supply voltage of the transconductance loop. An offset compensation signal of the transconductance loop is produced as a function of the detected actual value of the supply voltage based on a relationship between offset values and the supply voltage of the transconductance loop. The offset compensation signal is applied to a loop control signal of the transconductance loop. A drive current is applied to the voice coil motor. The drive current is related to a target drive current that is based on the loop control signal.

20 Claims, 9 Drawing Sheets

(56) References Cited

U.S. PATENT DOCUMENTS

| | | | |
|---|---|---|---|
| 5,789,973 A * | 8/1998 | Barrett, Jr. | H03H 11/0422 330/69 |
| 5,838,515 A * | 11/1998 | Mortazavi | H02P 25/034 360/78.12 |
| 6,084,378 A * | 7/2000 | Carobolante | G11B 5/5547 318/811 |
| 6,262,619 B1 | 7/2001 | McGreer et al. | |
| 6,420,910 B1 * | 7/2002 | Contreras | G11C 7/062 |
| 7,209,321 B1 * | 4/2007 | Bennett | G11B 5/59605 360/78.12 |
| 7,327,103 B1 * | 2/2008 | El-Sadi | G11B 5/5526 318/632 |
| 7,463,443 B2 * | 12/2008 | Schillaci | H02P 25/034 360/78.04 |
| 7,960,957 B2 * | 6/2011 | Clavette | H02M 3/157 323/272 |
| 8,873,193 B2 | 10/2014 | Galbiati | |
| 9,437,219 B1 * | 9/2016 | Wilson | G11B 5/09 |
| 10,749,455 B2 | 8/2020 | Boscolo Berto et al. | |
| 12,055,964 B2 * | 8/2024 | Cheng | H03F 3/45475 |
| 2002/0047734 A1 * | 4/2002 | Brambilla | H03F 3/3061 327/109 |
| 2002/0089378 A1 * | 7/2002 | Wu | H03F 3/45085 330/253 |
| 2007/0170878 A1 * | 7/2007 | Schillaci | H02P 25/034 318/400.04 |
| 2007/0236825 A1 * | 10/2007 | Xia | G11B 5/59605 360/78.04 |
| 2009/0027112 A1 * | 1/2009 | Li | H03F 1/3211 327/540 |
| 2010/0061022 A1 * | 3/2010 | Ayala, II | G11B 5/4806 |
| 2020/0393706 A1 * | 12/2020 | Vera Villarroel | H03F 3/45973 |
| 2021/0226624 A1 | 7/2021 | Maiocchi et al. | |
| 2023/0018651 A1 * | 1/2023 | Kawano | H02M 3/158 |
| 2023/0074792 A1 | 3/2023 | Boscolo Berto et al. | |
| 2023/0318493 A1 | 10/2023 | Galbiati | |
| 2023/0352050 A1 | 11/2023 | Galbiati et al. | |

* cited by examiner

METHOD OF OPERATING A VOICE COIL MOTOR AND CORRESPONDING CONTROL CIRCUIT

CROSS-REFERENCE TO RELATED APPLICATIONS

This application is a translation of and claims the priority benefit of Italian patent application number 102023000001830, filed on Feb. 6, 2023, which is hereby incorporated by reference to the maximum extent allowable by law.

TECHNICAL FIELD

The description relates to hard disk drives (HDDs). One or more embodiments can be applied, for instance, to hard disk drives used in processing devices such as computers, servers, data centers and the like.

BACKGROUND

Hard disk drives (HDDs) employ a spindle motor to rotate one or more disks as well as voice coil motors (VCMs) to move the heads with respect to the disk(s). That is, the spindle motor is used to spin the hard disk(s) on which data are stored and the VCM motor is used to position the read/write heads on the surface of hard disk(s). Hard disk drives thus include at least two motors (spindle and VCM) that are driven by power semiconductor devices (integrated circuits) usually referred to as power combos.

Positioning of the heads at the surface of the disks is desired to take place with high precision. This result is facilitated by a micro-controller that controls a position loop. In order to control the position of the heads, the controller modulates the current in the VCM motor through a transconductance amplifier that converts an input voltage (e.g., from a digital-to-analog converter DAC) into an output current.

Offset calibration of the transconductance loop facilitates an accurate control of the load current. Offset calibration is performed once, before the VCM usage. An issue with calibration lies in that the result is a function of supply voltage value, in so far as offset may vary during normal VCM operations if the supply voltage is not constant. Accurate calibration of the offset of such a transconductance loop as a function of variations in the supply voltage is thus a desirable feature of a hard disk drive.

SUMMARY

Embodiments can contribute in facilitating such accurate calibration.

One or more embodiments relate to a corresponding controller circuit.

One or more embodiments relate to a corresponding hard disk drive.

One or more embodiments relate to a corresponding processing device. A computer, a server, or data center equipped with a hard disk drive are exemplary of such a device.

One or more embodiments provide for dynamic compensation of the offset of a transconductance amplifier based on the measurement of the supply voltage.

Certain embodiments involve determining at least two offset values for two different supply voltage values, e.g., two different voltage values obtained from the supply voltage applied as a common-mode voltages at the inputs of the sense amplifier.

In certain embodiments, an instantaneous value for the offset is stored as obtained via a look-up table or as calculated based on a function that links the common mode voltage to a related offset.

In certain embodiments, two offset measurements are performed and the function is the equation of a straight line passing through two points.

BRIEF DESCRIPTION OF THE DRAWINGS

One or more embodiments will now be described, by way of example only, with reference to the annexed figures, wherein.

Corresponding numerals and symbols in the different figures generally refer to corresponding parts unless otherwise indicated.

The figures are drawn to clearly illustrate the relevant aspects of the embodiments and are not necessarily drawn to scale. The edges of features drawn in the figures do not necessarily indicate the termination of the extent of the feature. Also, for the sake of simplicity and ease of explanation, a same designation may be applied throughout this description to designate a circuit node or line as well as a signal occurring at that node or line.

Any quantitative values indicated in the figures are examples and non-limiting.

DETAILED DESCRIPTION OF ILLUSTRATIVE EMBODIMENTS

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment," "in one embodiment," or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

As discussed in the introductory portion of this description, HDD is an acronym for Hard Disk Drive.

A hard disk drive is a component of various types of processing devices such as personal computers, servers, data centers or the like and is the physical location where information is stored.

Hard disk drives (HDDs) employ a spindle motor to rotate one or more disks as well as voice coil motors or VCMs to move the heads with respect to the disk(s).

Figure 1:
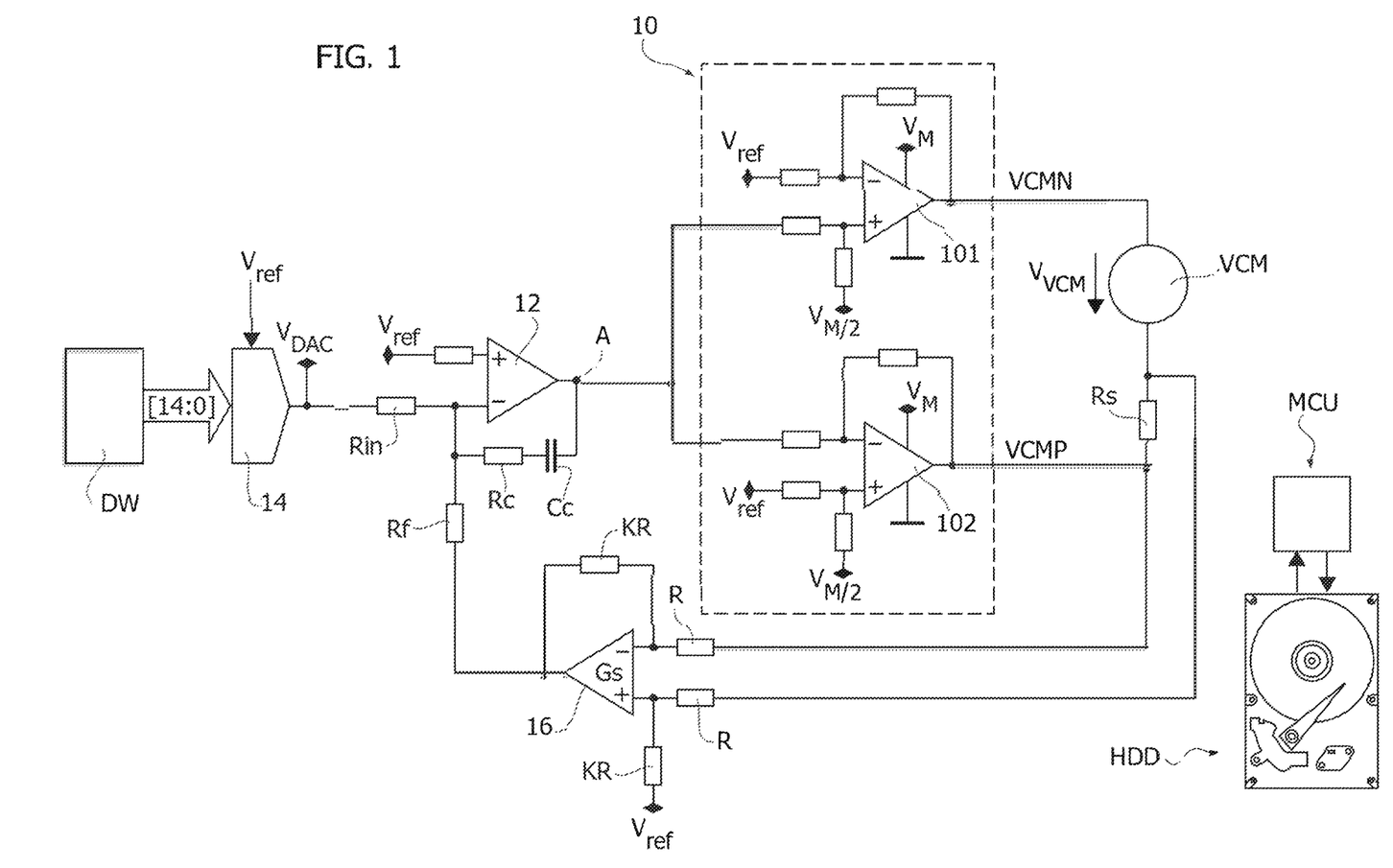
FIG. 1 is a block diagram of a current control loop circuitry ("transconductance amplifier") as used to control a VCM current in a hard disk application.

FIG. 1 is a block diagram of current control loop circuitry (as embedded in a power "combo") used in a hard disk application.

More specifically, FIG. 1 shows an example of a conventional transconductance amplifier used to drive a VCM motor in a hard disk drive HDD by driving a current $I_{vcm}$ through the motor windings.

The arrangement of FIG. 1 essentially comprises a power amplifier 10 that drives the VCM motor via two lines VCMN and VCMP with an amperometry sensor (such as a sensing resistor Rs, arranged between the motor and one of the lines VCMN and VCMP) configured to produce a signal indicative of the intensity of the current $I_{vcm}$ through the motor.

As illustrated in FIG. 1, the power amplifier 10 comprises two power stages 101 (with an output line VCMN) and 102 (with an output line VCMP) each comprising a differential amplifier such as an operational amplifier or op-amp supplied via a supply voltage VM, e.g., referred to ground.

Each of the power stages 101 and 102 has a first input (e.g., inverting for the stage 101 and non-inverting for the stage 102) configured to be coupled (e.g., via a voltage divider, illustrated and not expressly labelled for simplicity) to a reference node at a voltage Vref.

The supply voltage VM and the reference voltage Vref are generated in a manner known per se to those of skill in the art.

Each of the power stages 101 and 102 have second inputs (e.g., non-inverting for the stage 101 and inverting for the stage 102) configured to be coupled (e.g., via a voltage divider/coupling resistor, again illustrated and not expressly labelled for simplicity) to a common node A at the output of an error amplifier 12 (again an operational amplifier or op-amp, for instance).

The error amplifier 12 has a first input (e.g., non-inverting) configured to be coupled (e.g., via a coupling resistor, illustrated and not expressly labelled for simplicity) to a reference node at a reference voltage (this may be assumed to be again the reference voltage Vref, for simplicity).

The error amplifier 12 has a second input (e.g., inverting) coupled:
i) via a line including a resistor Rc and a capacitor Cc, to the output node A;
ii) via an input resistor Rin, to the output of a digital-to-analog converter DAC 14 (receiving the voltage Vref) providing a voltage $V_{DAC}$; and
iii) via a coupling resistor Rf to the output of a sense amplifier 16.

The sense amplifier 16 (once more, an operational amplifier or op-amp, for instance) has a first and second inputs (e.g., non-inverting and inverting) coupled (e.g., via a coupling resistors R) to the opposed ends of the sensing resistor Rs. Across the resistor Rs a voltage ($Rs*I_{VCM}$) can be sensed which is indicative of the intensity of the current $I_{vcm}$ across the motor VCM.

Resistors KR (assumed to be of equal value for simplicity) are provided between the output and the inverting input of the sense amplifier 16 and between the non-inverting input of the sense amplifier 16 and a reference node at a reference voltage (this may be assumed to be again the reference voltage Vref, for simplicity).

As illustrated, the sense amplifier output voltage is referred to Vref, this means the sense amplifier output voltage is equal to Vref if $I_{VCM}=0$ and is modulated across Vref if $I_{VCM}$ is not zero.

FIG. 1 is thus exemplary of a VCM driver, which is configured as a transconductance amplifier comprised of an (e.g., DMOS) H-bridge power stage 101, 102, an error amplifier 12, a current sense 16 amplifier, and an (e.g., 15-bit linear) voltage DAC converter 14.

As illustrated, the DAC converter 14 output voltage is referred to Vref. The DAC output voltage is thus equal to Vref if the digital word input to the DAC input is zero and is modulated across Vref in response to the DAC input word "DW" being different from zero. In the exemplary case considered here, the power amplifier (indicated as 10 as whole) can be a class AB voltage amplifier.

The error amplifier 12 is configured to close the transconductance loop, using feedback from the current sense amplifier 16 and an input command from the DAC converter 14.

The diagram of FIG. 1 is thus illustrative of a transconductance amplifier that includes a circuit configured to measure the current $I_{vcm}$ in a load (the motor VCM) and includes a sense amplifier 16 (assumed to provide gain Gs) that receives as an input the voltage $Rs*I_{VCM}$ obtained from the sensing resistor Rs arranged in series to the load (VCM).

The current $I_{vcm}$ in the load, controlled by the transconductance loop of FIG. 1, is a function of constant parameters (namely, the values for Rs, Gs, Rf, Rin) and of the output value $V_{DAC}$ of the digital-to-analog converter 14.

The digital-to-analog converter 14 is configured to receive an input digital word DW (e.g., [14:0]) generated in a manner known per se to those of skill in the art.

This relationship can be expressed in the form:

$$I_{VCM} = (Rf/Rin) * [1/(Rs*Gs)] * V_{DAC} = DC_{Gain} * V_{DAC}$$

In HDD applications, especially during head tracking operation, a servo controller MCU adjusts the VCM DAC register (DW) so as to drive the correct current to keep the heads on track.

The (e.g., 15-bit) voltage DAC 14 commands the current in the VCM circuit, with the DAC 14 controlled via the controller MCU through a serial port receiving a DAC word DW, [14:0], for instance.

The DAC output voltage is centered on the voltage Vref and is injected into the transconductance loop via the resistor Rin. For instance, positive DAC commands can drive positive VCM currents and negative DAC commands negative VCM currents; in certain embodiments, negative DAC commands can drive positive VCM currents and positive DAC commands negative VCM currents.

Positioning of the heads at the surface of the disks of the hard disk drive HDD (which is desired to take place with high precision) is facilitated by the micro-controller MCU associated with the hard disk drive HDD in order to control a position loop: in order to control the position of the heads, the controller MCU modulates the current in the VCM motor through a transconductance amplifier that converts an input voltage (e.g., from a digital-to-analog converter DAC) into an output current.

It will be appreciated that the representation in FIG. 1 (the same also applies to the representations in FIGS. 4, 5A, 5B and 6) is essentially functional, in that the motor VCM and the parts/elements associated therewith can in fact be incorporated in the hard disk drive HDD, while the associated controller MCU can be either incorporated in the hard disk drive HDD or be a distinct element.

Figures 2, 3:
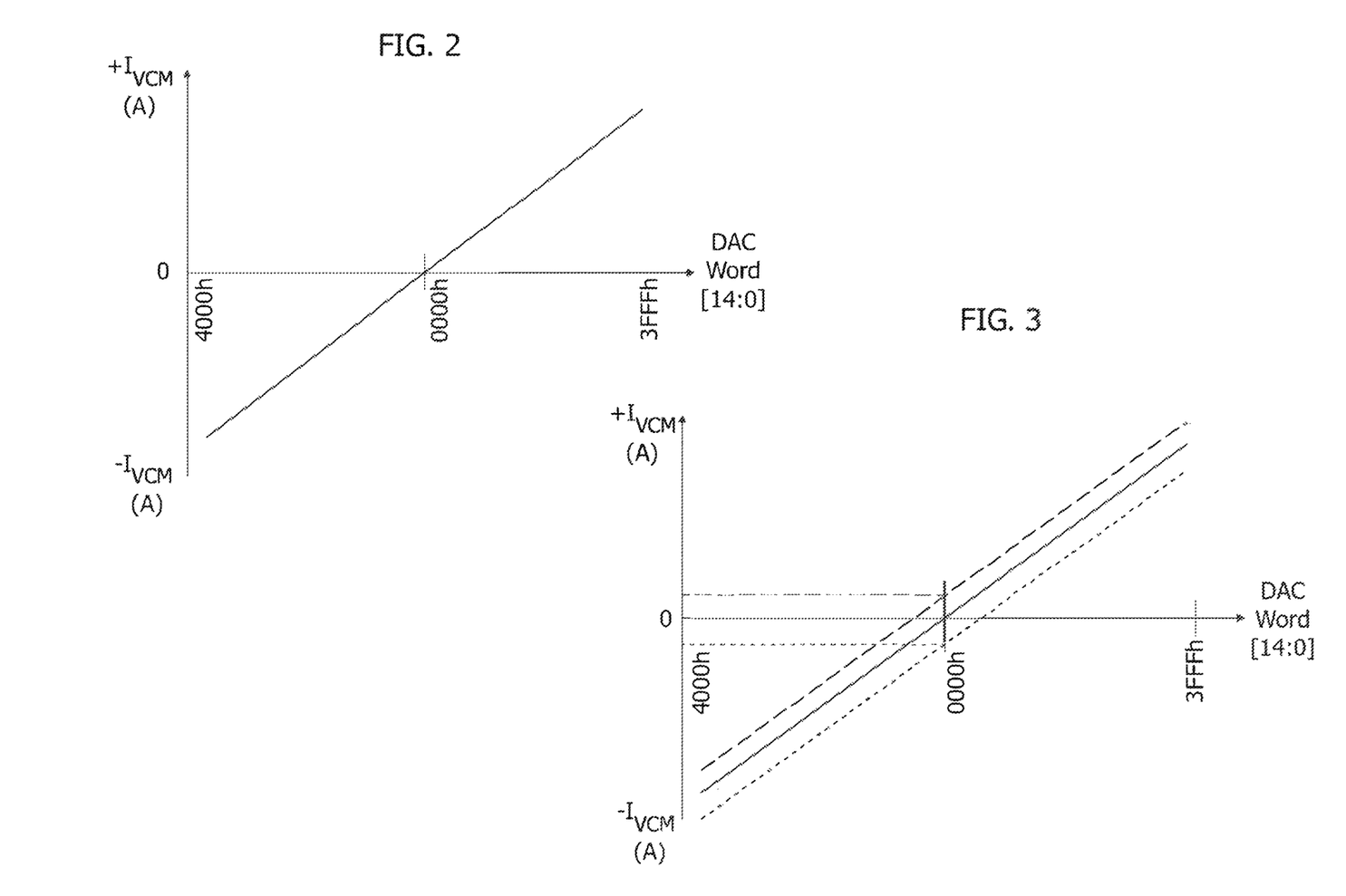
FIGS. 2 and 3 are diagrams exemplary of ideal and actual behavior of VCM current control loops.

The diagram in FIG. 2 shows an (ideal) transconductance characteristic that gives the VCM current $I_{VCM}$ as a function of the word DW written in the DAC 14.

As noted, this is an ideal characteristic, assuming that a zero DAC value translates into a corresponding zero current driven into the motor (VCM).

Even though these factors do not appear in the formula reported above, the current $I_{vcm}$ in the load is in fact affected by offsets generated by the sense amplifier 16 and by the error amplifier 14.

The actual loop behavior may thus be (quite) different: due to offset in the components of the VCM current loop (primarily the error and sensor amplifiers 12 and 16), a zero DAC value (DAC input word DW) does not result in a corresponding zero VCM current.

This is exemplified in the diagram of FIG. 3, where the "ideal" $I_{VCM}$ v. DAC Word behavior of FIG. 2 is portrayed (in continuous line) against possible actual behaviors for positive offset (chain line) and negative offset (dashed line).

In order to remedy situations as portrayed in FIG. 3, a DAC register value can be used given by the sum (with sign) of the value coming from the servo loop and a value obtained via a zero VCM current offset calibration procedure. In that way, the servo loop is supplied with a "calibrated" correct value that is written into the DAC 14.

A power combo can thus be configured to perform a calibration routine that measures (and eventually cancels) the VCM current control loop offset. Calibrating the offset of the transconductance amplifier may thus facilitate achieving a notionally zero (or very small) offset. That calibration routine can be performed (under the control of the controller MCU, for instance) before track following operation of the heads is started.

In that way an accurate control of the position of the motor (VCM) is facilitated by the transconductance amplifier having an offset that is notionally zero or, in any case, very small.

Figure 4:
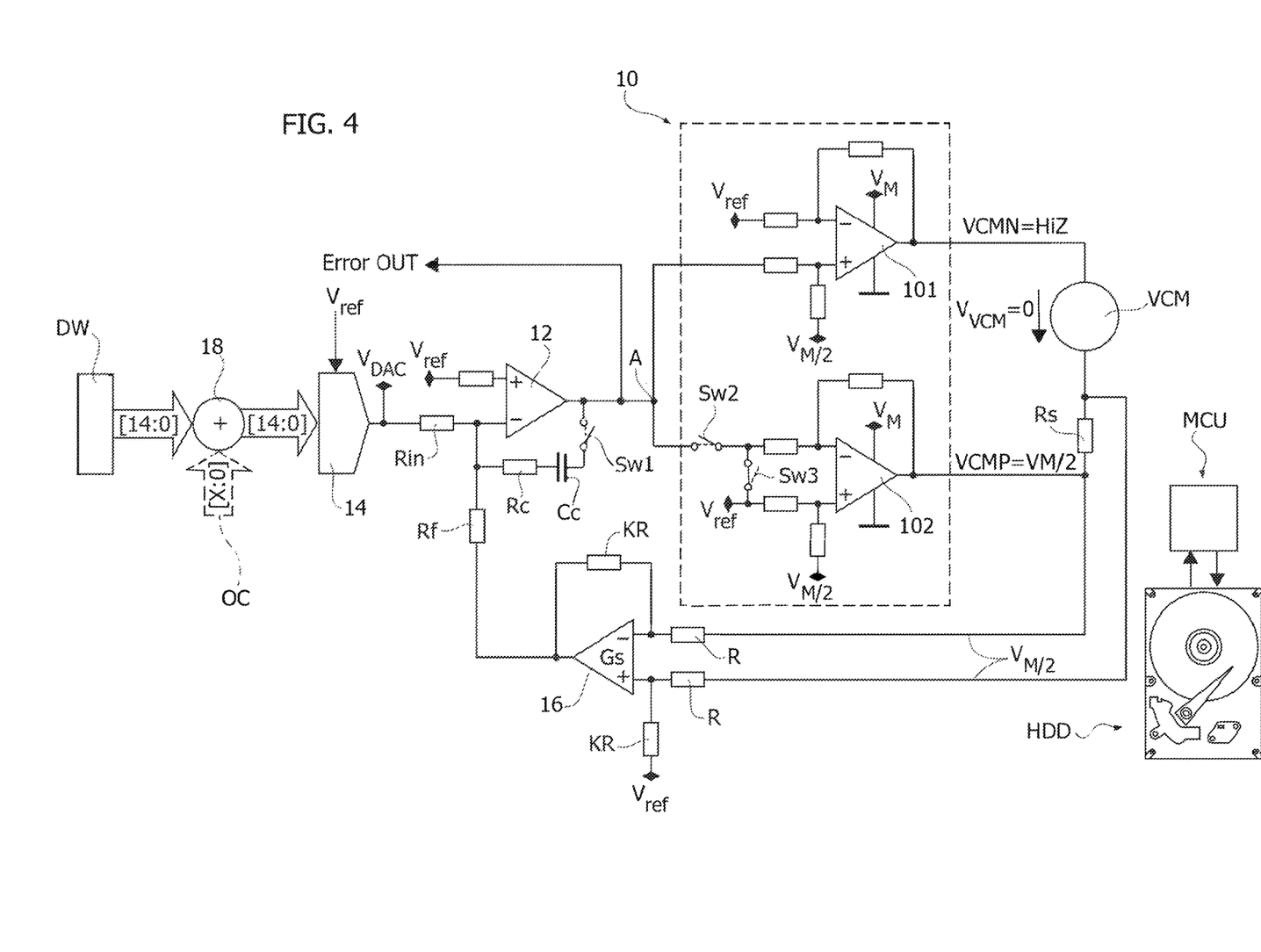
FIG. 4 is exemplary of conventional offset calibration and compensation in a transconductance amplifier in current control loop circuitry as illustrated in FIG. 1, FIGS. 5A and 5B are illustrative of offset measurement according to embodiments of the present description.

FIG. 4 (where parts or elements like parts or elements already discussed in connection with FIG. 1 are indicated with like reference symbols) is exemplary of a conventional approach to calibration wherein a zero current is forced in the load (motor VCM) and the inputs of the sense amplifier 16 are forced to a voltage Vm/2 that is selected equal to half the supply voltage VM of the power stage (a different notation is deliberately retained for clarity).

More specifically, FIG. 4 is exemplary of a circuit configuration that can be used for measuring offset in current control loop circuitry, with the results of such offset measurement eventually used for offset compensation.

In (conventional) offset measurement as illustrated in FIG. 4, one branch of the power stage (e.g., the stage 101) is forced to high impedance—in a manner known per se—to have zero current in the load while the other branch of the power stage (e.g., the stage 102) is kept active and forced to a value Vm/2 where Vm is equal to the (normal) supply voltage value VM.

This type of operation can be facilitated via switches Sw1, Sw2 and Sw3 that can be implemented in a manner known per se to those of skill in the art, e.g., as a MOSFET transistors and can be operated (turned on=conductive and off=non-conductive) under the control of the controller MCU, for instance.

The switch Sw1 is included in the feedback loop of the error amplifier 12. With switch Sw1 open (that is, non-conductive), the error amplifier 12 behaves as a comparator.

The switch Sw2 is arranged intermediate the node A and the stage 102 and, when open (non-conductive) decouples the stage 102 from the node A, thus from the error amplifier 12. It is noted that the other stage 101 is forced to high impedance to have zero current in the load.

The switch Sw3 is arranged (via coupling resistors that are illustrated and not expressly referenced) across the inputs of the stage 102 and, when closed (conductive), the switch Sw3 causes both these inputs (and not just the non-inverting input) to be coupled to the reference voltage Vref forcing, de facto, a null differential voltage across the inputs of the stage 102. In these conditions the output of the stage 102 is forced to Vm/2.

The sense amplifier 16 and the error amplifier 12 are enabled, the output VCMN is tri-stated (at a high impedance HiZ) and the output VCMP is forced to Vm/2 (Sw2 is open and Sw3 is closed).

The switch Sw1 is open, allowing the error amplifier to behave as a comparator (in that way, only two voltage levels are allowed, positive or negative saturations).

The output of the error amplifier 12 on a line Error OUT is routed to a serial port register in order to make it readable during calibration (error sign).

With this configuration the VCM DAC 14 can be swept (sweeping the input word DW), and the output of the error amp 12 (error sign) can be monitored via firmware. The loop offset is measured (e.g., as a value of the digital word DW input to the DAC converter 14) when the error amp output on the line Error OUT (error sign) switches states.

It is noted that with the power stage 10 configured with the VCMN line in tristate (HiZ) and the VCMP line driven at Vm/2, the sense resistor Rs is driven at Vm/2 too, setting the voltage of the inputs of the sense amplifier 16 at a known voltage amplitude.

This offset calibration (offset measurement) method can be implemented under the control of the controller MCU and is advantageous in HDD applications because the common mode voltage of the sense amplifier 16 inputs equal to Vm/2 is equivalent to the common mode voltage of the sense amplifier 16 inputs during the track following operation (track following is performed at low current and both VCM driver outputs VCMP and VCMN are both very close to Vm/2).

That is, under the conditions exemplified in FIG. 4:
the differential voltage across the sense amplifier 16 is equal to zero (due to the current $I_{VCM}$ being zero) while a common-mode input voltage is applied to the sense amplifier 16 equal to Vm/2, and
the output of the sense amplifier 16 will be equal to Vref+offset where the offset indicates a voltage offset value (ideally zero, but in fact different from zero due to construction inaccuracies of the sense amplifier itself).

Figure 6:
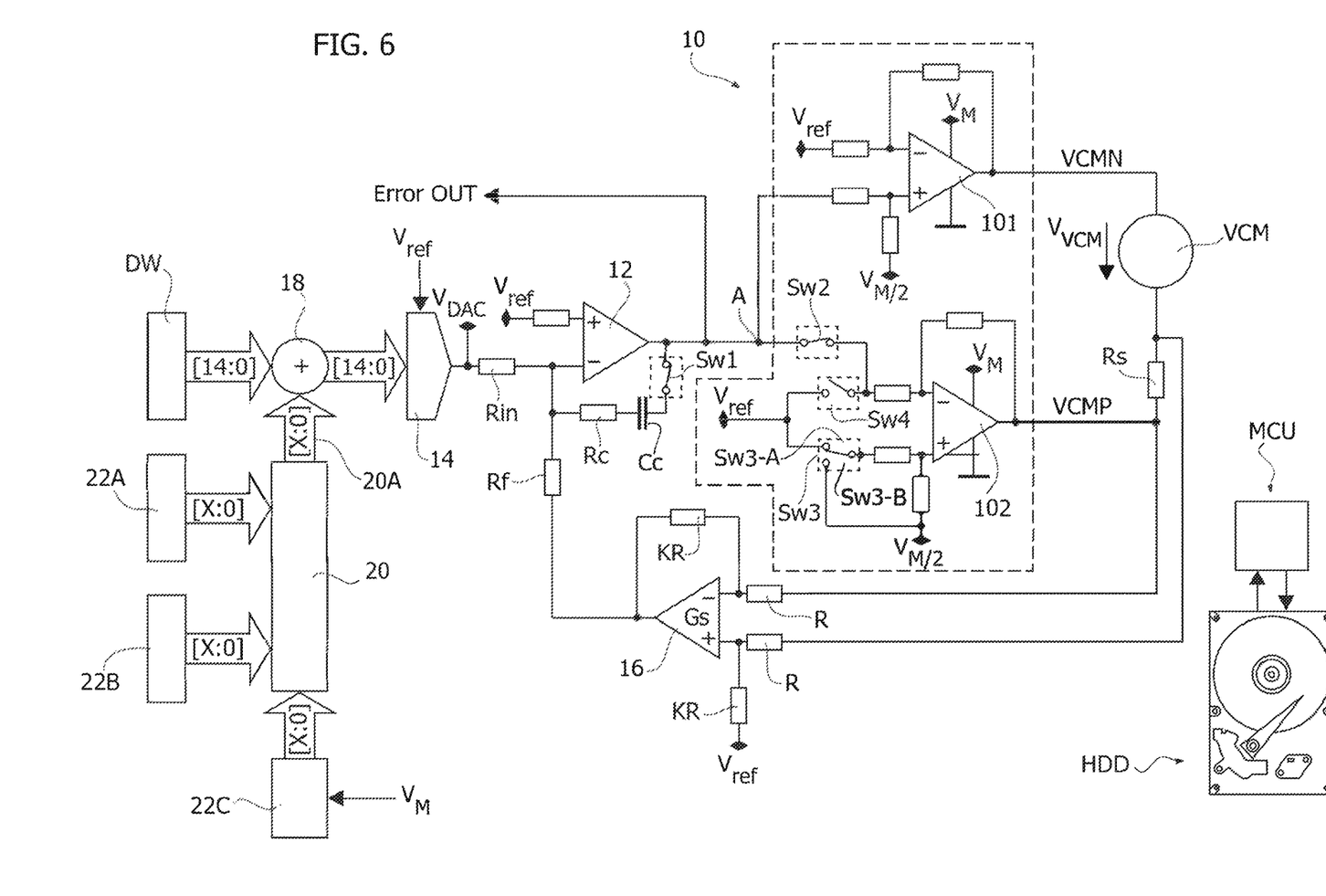
FIG. 6 is a block diagram exemplary of how results of offset measurement as exemplified FIGS. 5A and 5B can be used for offset compensation according to embodiments of the present description.

During calibration of the offset of the transconductance amplifier (offset measurement), the gain of the error amplifier 12 is (markedly) increased by opening the switch Sw1 in the feedback path of the error amplifier 12 as shown in FIG. 6.

This increased gain facilitates the detection of changes of sign of the error which is carried out by analyzing the output of the error amplifier available over a line Error OUT.

Under ideal conditions (zero offset) the signal on the line Error OUT changes polarity when the DAC input word DW moves around zero and, as consequence, the output signal from the DAC converter 14 moves around the reference value Vref (as illustrated the DAC converter 14 is configured to have an output voltage equal to Vref when its input word DW is zero).

Conversely, in real conditions the change in error polarity takes place instead for values of the input word DW other than zero (for DAC output other than Vref), which depend on the offset of the sense amplifier 16 and the offset of the error amplifier 12: see the diagram of FIG. 3 for reference.

A calibration procedure as exemplified in FIG. 4, therefore, involves a search for a value for the input word DW that, if applied to the DAC converter 14, produces a change of sign at the output of the error amplifier (line Error OUT).

This value can then be used as an offset compensation signal OC of the transconductance loop. Such an offset compensation signal OC can be applied (e.g., at a summation node 18—with sign—at the input of the DAC converter 14) to the loop control signal DW of the transconductance loop 10, 12, 16.

In FIG. 4 the offset compensation signal OC is represented in dashed lines to highlight the fact that offset compensation is distinct from the offset measurement phase discussed previously.

In fact, offset compensation (injection of the signal OC into the input word DW at the node 18) takes place with the transconductance loop 10, 12, 16 brought to its normal operating condition, with the switches Sw1 and Sw2 closed—that is, conductive—and the switch Sw3 open—that is, non-conductive—as indicated by dashed lines in FIG. 4.

Operation as discussed so far in connection with FIGS. 1 through 4 is per se conventional in the art, which makes it unnecessary to provide a more detailed description herein.

A problem with (conventional) offset calibration as discussed in connection with FIG. 4 lies in that calibration is performed at a specific/instantaneous value of the power supply voltage VM which can then vary significantly during normal system operation.

It is observed that the power supply voltage of an HDD can undergo variations of +/-10% or higher, consequently producing variations in the common-mode voltage present across the sense amplifier 16 (equal or very close to Vm/2 during normal VCM operations).

The sense amplifier is in fact characterized by a common-mode rejection ratio that has a finite (non-infinite) value. This results in a voltage at the output of the sense amplifier 16 that is a function of the common-mode input voltage.

A conventional calibration approach as discussed in connection with FIG. 4 does not take into account possible offset variations caused by the variation of the common mode voltage present at the input of the sense amplifier 16.

Once such a (conventional) VCM offset calibration (offset measurement) is performed, the resulting value is kept fixed during subsequent offset compensation (as represented in dashed lines in FIG. 4) independently of any variations in the power supply level VM.

Changes in the power supply level result in changes in the common mode at the inputs of the sense amplifier 16, which in turn result in variations of the output of the sense amplifier 16 that will be not adequately compensated by the offset calibrated (measured) value. The VCM current will be shifted with respect to the desired value computed by the VCM position control loop (microcontroller) and imposed through the DAC input word DW.

This offset variation is a source of nuisance that produces unwanted effects such as an increased run-out (the error during track following).

Figure 5A:
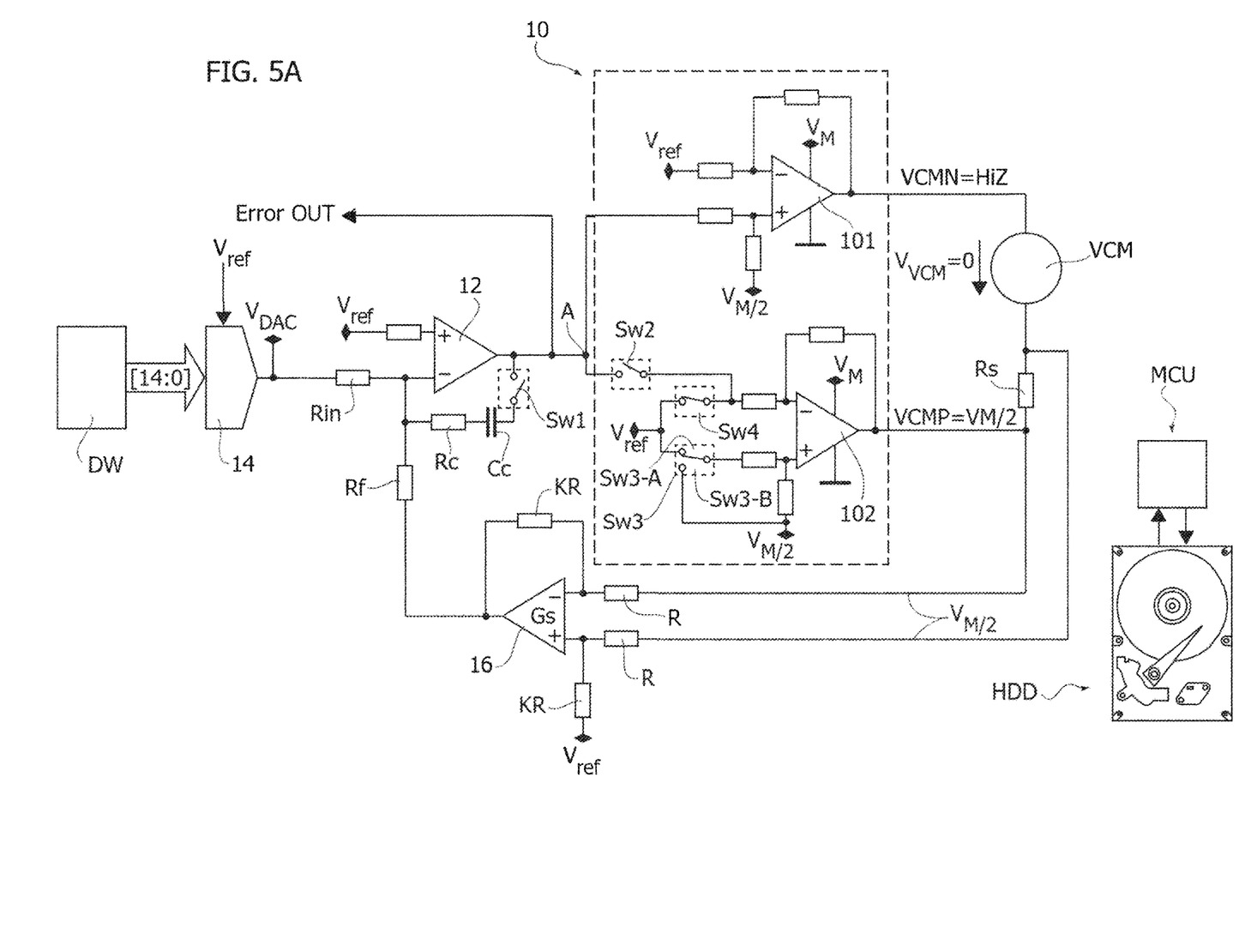
Figure 5B:
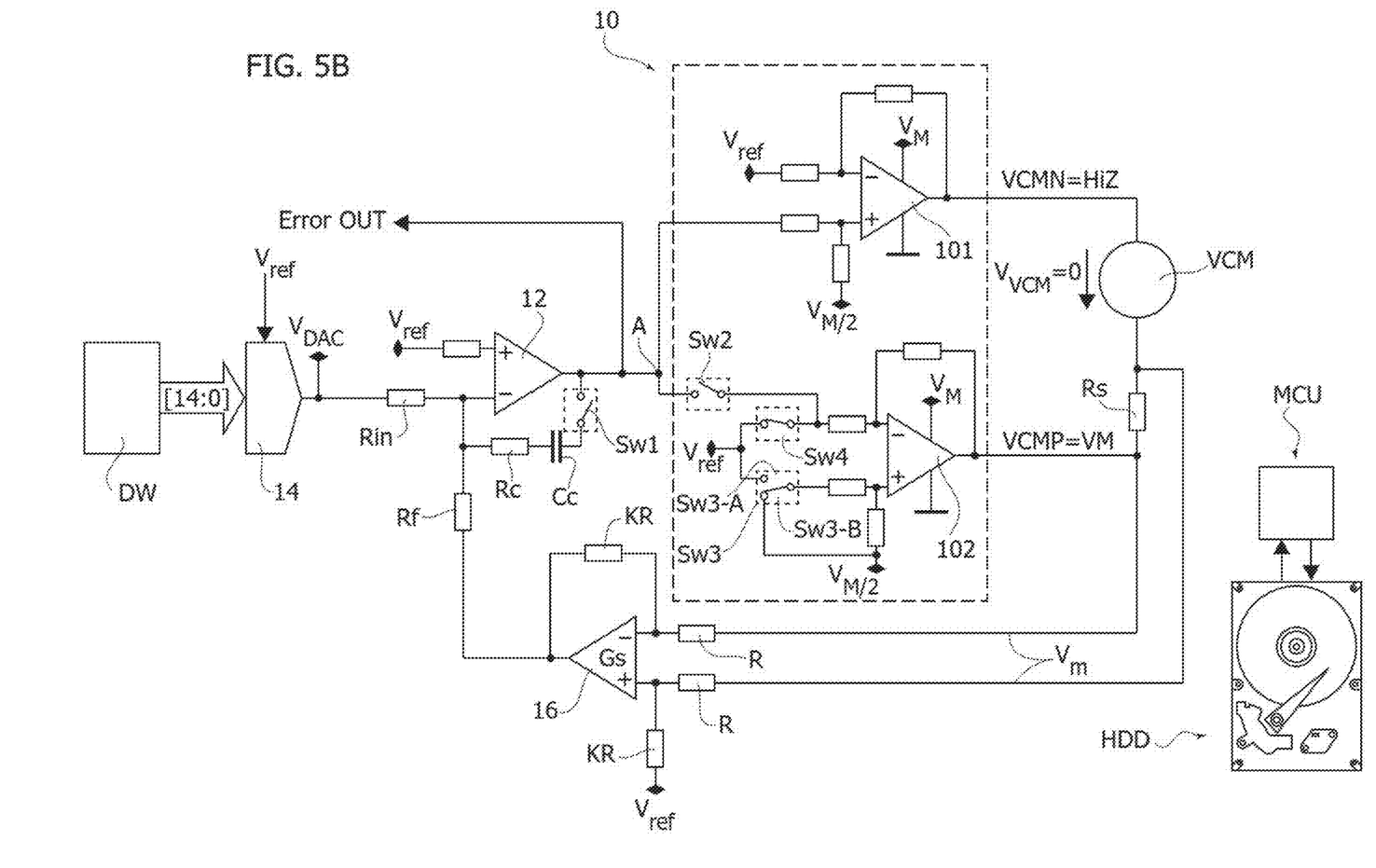
Figure 7:
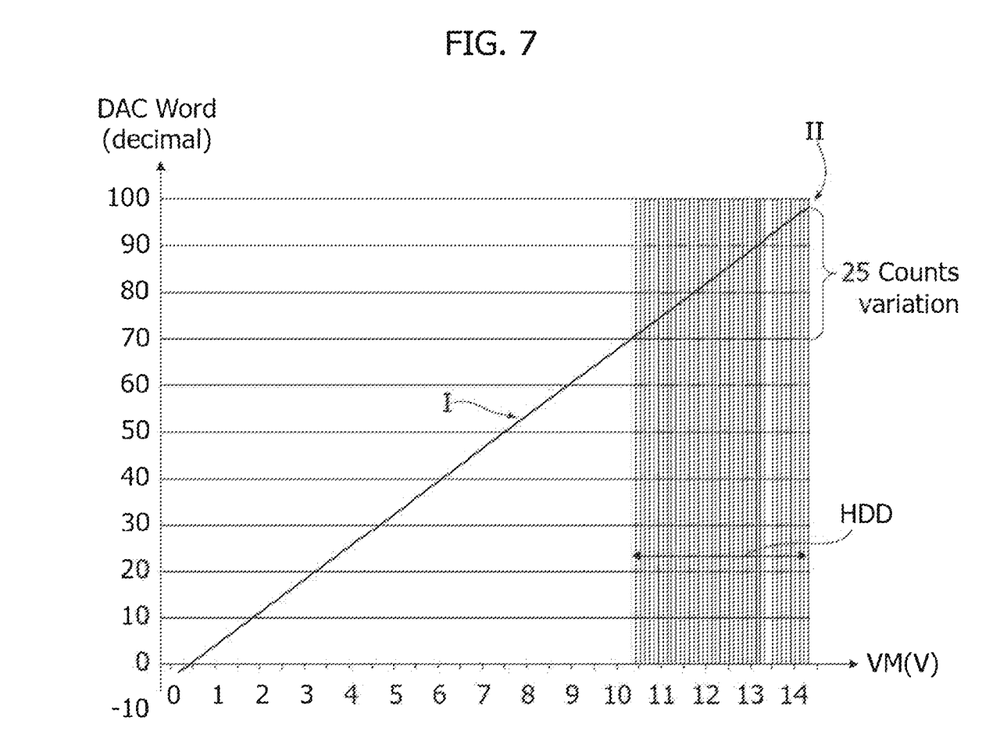
FIG. 7 is an exemplary diagram of loop offset compensation in embodiments of the present description.
Figure 8:
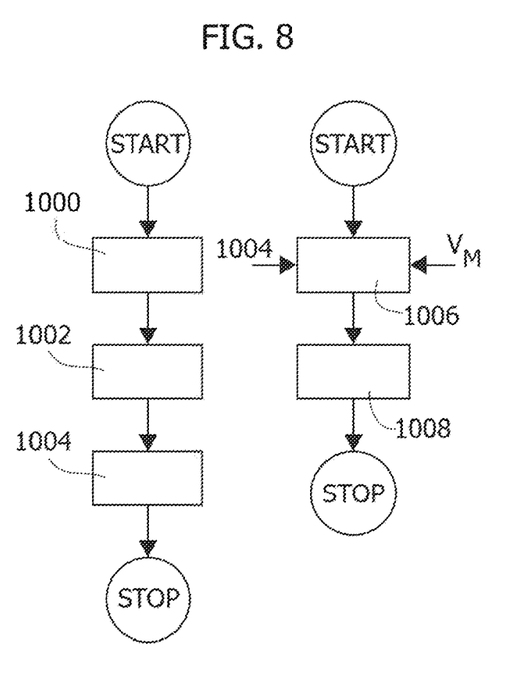
FIG. 8 is a flow-chart of a loop offset calculation and compensation procedures according to embodiments of the present description.
Figure 9A:
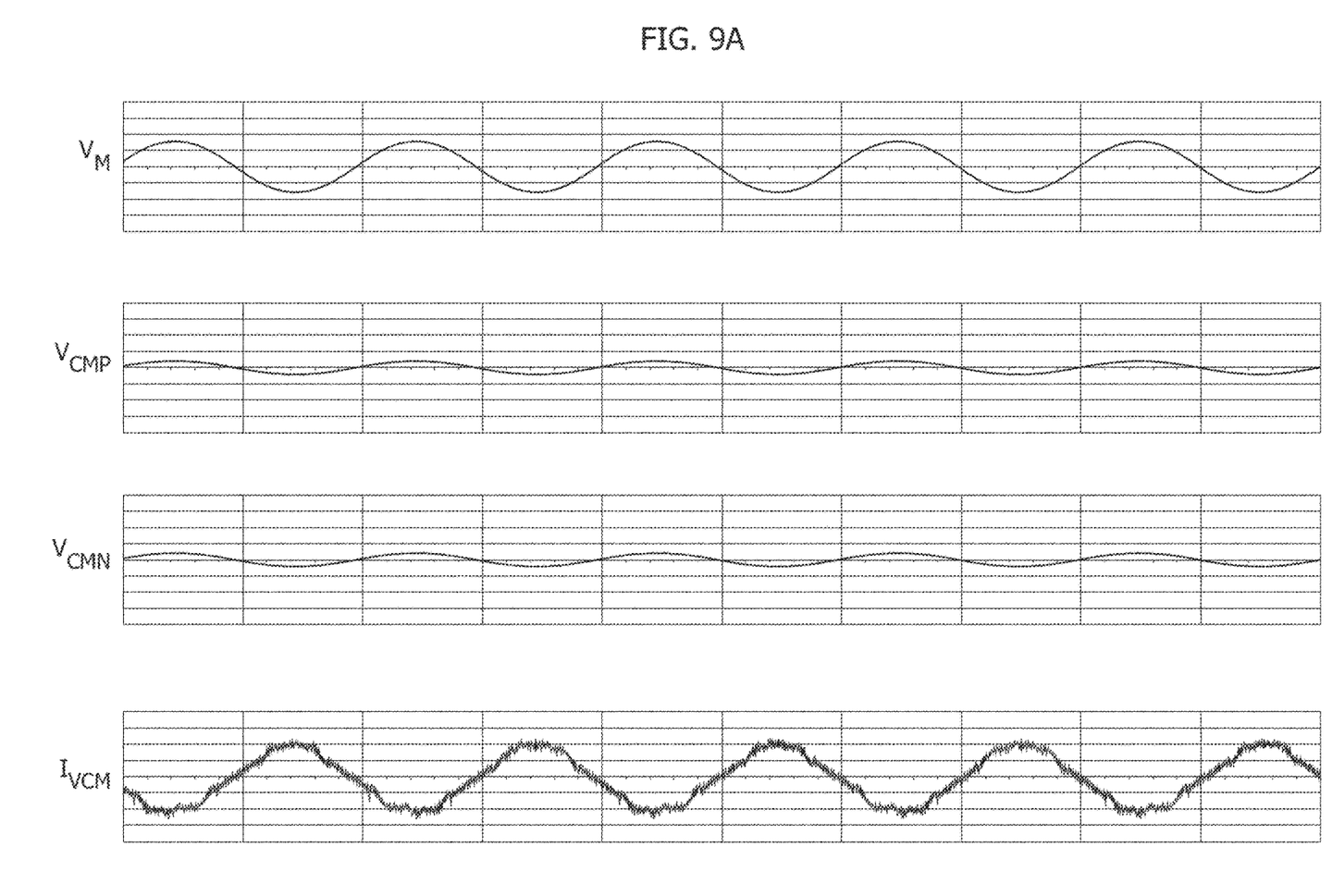
FIGS. 9A and 9B are combined diagrams comparative of conventional offset compensation (FIG. 9A) and offset compensation according to embodiments of the present description (FIG. 9B).
Figure 9B:
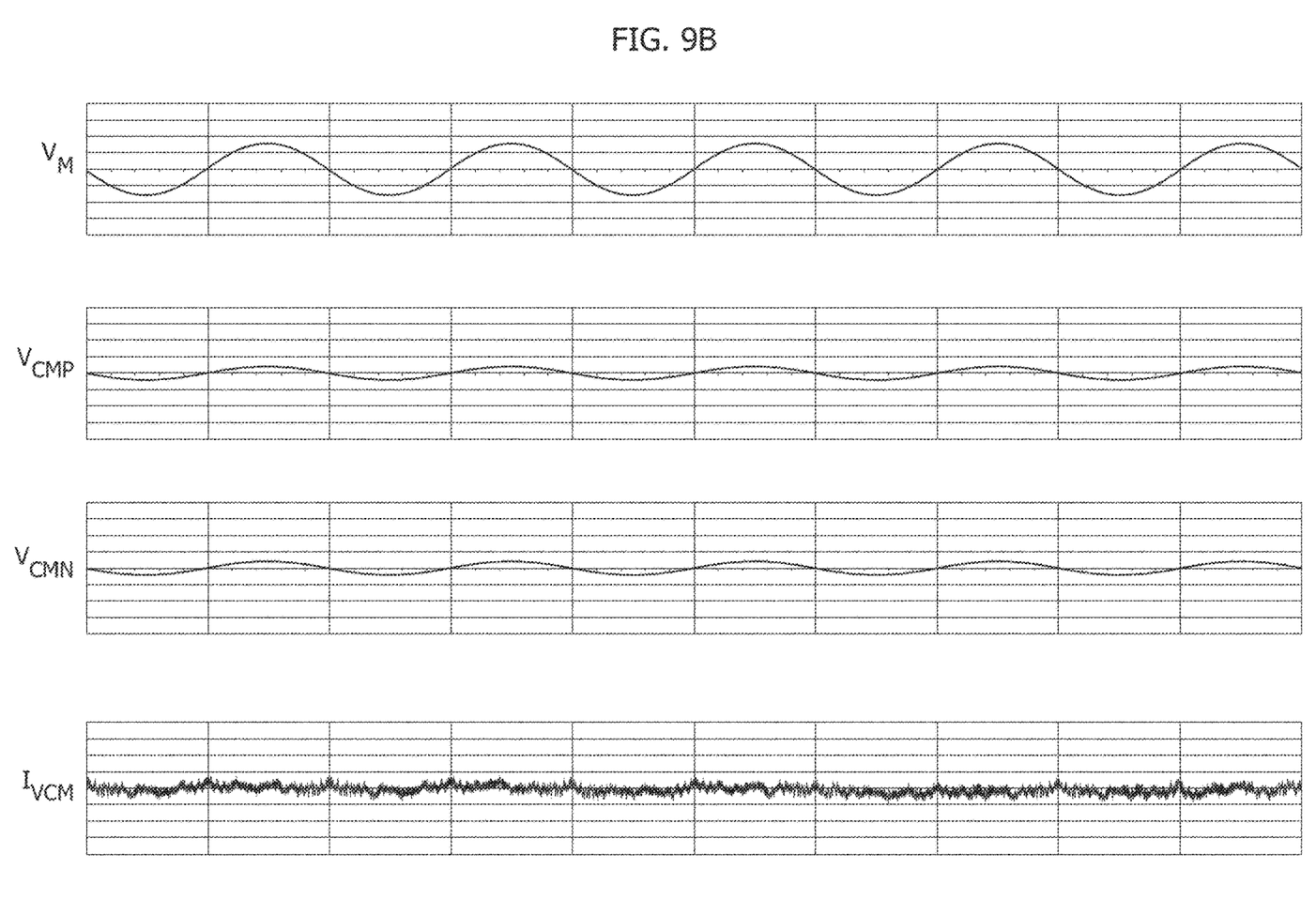

A solution as discussed herein in connection with FIGS. 5A, 5B (offset measurement/calibration) and 6 (offset compensation), plus FIGS. 7 to 9 is able to reduce the error present on the zero VCM current offset calibration value (performed at fixed power supply level) irrespective of possible changes in the power supply level in an operating range of, e.g., to about 10V to 14V).

Various solutions as discussed herein in connection with FIGS. 5A, 5B, and 6 to 9 facilitate taking into account offset variations in a transconductance amplifier that occur as a function of the value of the power supply voltage. Accuracy in track following is thus improved also in the presence of a power supply voltage that is not stable.

In the following, parts or elements like parts or elements already discussed in connection with FIGS. 1 through 4 are indicated with like reference symbols: a detailed description of these parts or elements as already provided also applies to the subsequent figures and will not be repeated for brevity.

Solutions as discussed in connection with 5A, 5B, and 6 to 9 address the problem of offset variation that may occur due to the variation of the supply voltage VM of a transconductance amplifier.

As noted, the common-mode voltage at the drive stage output (and therefore the voltage at the inputs of the sense amplifier 16) is usually forced to Vm/2 (half the supply voltage VM) in order to exploit the full dynamics of the power stage. This however implies a corresponding variation as the supply voltage VM varies. The variation of the supply voltage VM and therefore of Vm/2 produces undesired variations on the output voltage of the sense amplifier 16 and therefore an offset variation in the transconductance amplifier.

It is noted that the variation of the transconductance amplifier offset is due to the variation of the output of the sense amplifier 16 due to its limited CMRR. A change in in common-mode voltage at the inputs of the sense amplifier 16 results in a (small, yet not nil) change in the voltage at the output of the sense amplifier 16, and this results in a non-constant offset in the current controlled by the transconductance loop.

It is observed that the common mode voltage value (Vm/2) is a function of the supply voltage VM, which facilitates compensating with a feed-forward approach the variations of the offset of the transconductance loop using the direct measurement of the supply voltage and correcting dynamically the value of the offset to insert in the loop.

FIGS. 5A and 5B show an example of calibration (essentially, offset measurement) according to embodiments of the present description, where two different common-mode voltages are forced to the inputs of the sense amplifier 16 in order to evaluate their effects (in terms of offset) on the transconductance loop.

Embodiments of the present description can thus be applied to operating (at least) one voice coil motor VCM in a hard disk drive via a transconductance loop 10, 12, 16 having a supply voltage VM.

It is once again reminded that the representation in FIGS. 4, 5A, 5B and 6 is essentially functional, in that the motor VCM and the parts/elements (primarily the transconductance loop) associated therewith can in fact be incorporated in the hard disk drive HDD, while the associated controller MCU that controls operation of the HDD as discussed herein can be either incorporated in the hard disk drive HDD or be a distinct element.

The transconductance loop as illustrated in figures such as FIGS. 5A, 5B and 6 again comprises:

- a power stage 10 configured (see, e.g., the stages 101 and 102 producing the signals VCMN and VCMP) to apply a drive current to the voice coil motor VCM,
- a differential sense amplifier 16 having first and second inputs coupled to a current sensor (e.g., a resistor Rs) of the voice coil motor VCM wherein the sense amplifier 16 is configured to produce a sense signal indicative of the drive current $I_{vcm}$ applied to the voice coil motor VCM.

Likewise, the transconductance loop as illustrated in FIGS. 5A, 5B and 6 comprises an error amplifier 12 configured to receive a loop control signal (such as a digital word DW received via a digital-to-analog, DAC converter 14, and possibly compensated as discussed in the following) to produce a "target" (namely, a desired) drive current for the voice coil motor VCM.

As illustrated, the error amplifier 12 is coupled to the power stage 10 to drive the power stage based on the loop control signal (essentially the digital word DW as received once converted to analog by the DAC converter 14) and the sense signal.

As noted, such a transconductance loop and its basic principle of operation are per se conventional, which makes it unnecessary to provide a more detailed description herein.

Embodiments of the present description can be implemented using virtually any number of (at least two) measurements and (at least two) values of the voltages across the inputs of the sense amplifier 16 used for the implementation.

For simplicity and ease of understanding, FIGS. 5A and 5B refer to an example of calibration where two offset measurements with two different voltage values are performed.

This facilitates establishing, based a first offset value and a second offset value, a relationship between offset values and supply voltages of the transconductance loop, namely calculating a characteristic function which, in a simple case, is the equation of a straight line passing through two (measured) points.

Based thereon (as further discussed in the following) an offset compensation signal 20A (see FIG. 6) of the transconductance loop can be calculated to be applied at summation node 18 at the input of the DAC converter 14 to the loop control signal DW of the transconductance loop 10, 12, 16.

Such offset compensation (injection of the signal OC into the input word DW at the node 18) takes place with the transconductance loop 10, 12, 16 brought to its normal operating condition.

FIGS. 5A and 5B thus refer to an example of calibration according to embodiments of the present description where two offset measurements are used, obtained with two different common-mode voltages forced at the sense amplifier 16 inputs.

FIG. 5A shows an example of a circuit suitable for forcing a common-mode voltage equal to Vm/2, that is, equal to half VM, while FIG. 5B shows an example of a circuit suitable for forcing a common-mode voltage Vm equal to VM.

This type of operation is again facilitated (as in the case of FIG. 4) via the switch Sw2 that, when non-conductive, decouples the stage 102 from the node A, thus from the error amplifier 12. It is noted that the other stage 101 is forced to high impedance to have zero current in the load.

This type of operation is likewise facilitated by a modified arrangement of the switch Sw3 and the addition of a further switch Sw4 (these can again be implemented in a manner known per se to those of skill in the art, e.g., as a MOSFET transistor) configured to:

- couple the non-inverting input of the stage 102 to the inverting input of the stage 102 (with the switch Sw3 closed in a first position, e.g., Sw3-A, and Sw4 closed) so that a voltage VM/2 results at the stage 102 output—see FIG. 5A;
- decouple the non-inverting input of the stage 102 from the inverting input (with the switch Sw3 closed in a second position, e.g., Sw3-B, and Sw4 closed) so that a voltage VM results at the stage 102 output—see FIG. 5B.

Here again, a switch is regarded as closed when brought to conductive state.

It is otherwise noted that the values referred herein (Vm/2=VM/2 and Vm=VM, respectively) are merely indicative of a pair of values that can be used to identify two different transconductance loop offset values. Other (pairs of) values can be used: Vm=VM and GND, respectively, are another possible example.

Again, during calibration of the offset of the transconductance amplifier (offset measurement) as exemplified in FIGS. 5A and 5B, the gain of the error amplifier 12 can be (markedly) increased by opening the switch Sw1 in the feedback path of the error amplifier 12.

This increased gain facilitates the detection of changes of sign of the error signal Error OUT which is carried out by analyzing the output of the error amplifier available over the line Error OUT.

As noted, under ideal conditions (zero offset) the signal on the line Error OUT changes polarity when the input word DW to the DAC converter 14 moves around zero and, as consequence, the output signal from the DAC converter 14 moves around the reference value Vref (again, as illustrated in FIGS. 5A, 5B and 6, the DAC converter 14 is configured to have an output voltage equal to Vref when its input word DW is zero).

In real conditions (see again the diagram of FIG. 3 for reference) the change of polarity (sign) of the error signal Error OUT takes place instead for values of the input word DW other than zero (for DAC output other than Vref), which depend on the offset of the sense amplifier 16 and the offset of the error amplifier 12.

A calibration procedure as exemplified in FIGS. 5A and 5B again involves a search for values (e.g., a first and a second value) for the input word DW that, if applied to the DAC converter 14, produce a change of sign (polarity) of the output of the error amplifier (line Error OUT).

Once these values for the offset voltage and the supply voltage have been measured (the latter can be made available thanks to a dedicated ADC converter that is usually available in HDD power combos) the possibility will then exist of implementing (e.g., via the controller MCU, based on the signal on the line Error OUT) the function which links the offset value of the transconductance loop to the value Vm.

If for example, as in FIGS. 5A and 5B, the two common-mode voltages used for the double offset measurement are Vm/2=VM/2 and Vm=VM it is be possible, based on the value for VM using the simple calculation of the function of a straight line passing from two points, calculate the value of the offset to insert in the circuit for each value of VM in order to restore a situation like the one shown in FIG. 2 and valid for any value of VM voltage.

To summarize, a calibration as discussed herein comprises (at least) one first calibration condition—as exemplified in FIG. 5A—and (at least) one second calibration condition—as exemplified in FIG. 5B.

In the first calibration condition, the first and second inputs of the sense amplifier 16 have applied thereto a first common input voltage (e.g., Vm/2=VM/2) and a first value of the DAC input word DW is determined which results—in such a first calibration condition—in a change of sign (polarity) of the error signal Error OUT.

In the second calibration condition, the first and second inputs of the sense amplifier 16 have applied thereto a second common input voltage VM and a second value of the DAC input word DW is determined which results—in such a second calibration condition—in a change of sign (polarity) of the error signal Error OUT.

The second common input voltage VM is different from the first common input voltage VM/2 and at least one (and optionally both) of the first and second common input voltages is/are a function of the supply voltage VM of the transconductance 10, 12, 16).

Based on the first value and the second value of the DAC input word DW that were found to result—in the first and the second calibration condition, respectively—in a change of sign (polarity) of the error signal Error OUT, a relationship is established between these two "offset" values (as expressed, for instance, in terms of values of DAC input word DW) and the supply voltage VM: this is feasible relying on the fact that at least one (and optionally both) of the first and second common input voltages is/are a function of the supply voltage VM of the transconductance loop.

An actual value of the supply voltage VM can thus be detected and an offset compensation signal 20A of the transconductance loop can be produced as a function of the actual detected value of the supply voltage VM based the relationship (e.g., a straight line) between the (at least) two values for the DAC input word DW measured during offset calibration and the supply voltage VM.

As exemplified in FIG. 6, an offset compensation (cancellation) signal 20A of the transconductance loop 10, 12, 16 can thus be applied (at a node 18, for instance) to the loop control signal DW, namely the DAC input word DW indicative of the (desired) target drive current for the voice coil motor VCM (e.g., in order to achieve a zero current $I_{VCM}$ for a zero input word DW).

To summarize, various embodiments as discussed herein involve at least one first calibration condition and at least one second calibration condition.

In the first calibration condition (as exemplified in FIG. 5A), the first and second inputs of the sense amplifier 16 have applied thereto a first common input voltage (VM/2) and the error amplifier 12 has applied thereto the loop control signal (the digital word DW received via the DAC converter 14, for instance) with a first (offset) value that produces a commutation in the sign of the error signal Error OUT at the output of the error amplifier 12 in the first calibration condition.

In the second calibration condition (as exemplified in FIG. 5B) the first and second inputs of the sense amplifier 16 have applied thereto a second common input voltage VM and the error amplifier 12 has applied thereto the loop control signal DW with a second (offset) value that produces a commutation in the sign of the error signal Error OUT at the output of the error amplifier 12 in the second calibration condition.

The second common input voltage VM is different from the first common input voltage VM/2 and at least one (and advantageously both) of the first and second common input voltages is/are a function of the supply voltage VM of the transconductance loop 10, 12, 16.

Again, in an arrangement as exemplified in FIGS. 5A, 5B, and 6, the error signal Error OUT (that drives via the node A the power stage 10 and thus the load represented by the motor VCM) depends on the difference between the two inputs of the error amplifier 12, e.g.:
 a non-inverting input, coupled (e.g., via a resistor) to a reference node at voltage Vref; and
 an inverting input, coupled (e.g., via the resistor Rin) to the DAC converter 14 as well as (e.g., via the resistor Rf) to the output of the sense amplifier.

Based on the first offset value and the second offset value, a relationship is established between offset values and the supply voltage VM of the transconductance loop 10, 12, 16.

An actual value of the supply voltage VM of the transconductance loop 10, 12, 16 is detected and an offset compensation signal 20A of the transconductance loop 10, 12, 16 is produced as a function of the actual detected value of the supply voltage VM based on the relationship established between the offset values and supply voltage VM of the transconductance loop 10, 12, 16.

Such an offset compensation signal can thus be applied (e.g., at the summation node 18—with sign—at the input of the DAC converter 14 as exemplified in FIG. 6) to the loop control signal DW of the transconductance loop 10, 12, 16.

As illustrated (during the calibration phases exemplified in FIGS. 5A and 5B), the power stage 10 can be at least partially de-activated (stage 101 in HiZ state) to discontinue supplying drive current to the voice coil motor VCM during the first calibration condition and the second calibration condition.

FIG. 6 shows a possible practical implementation of how the results of the calibration phases exemplified in FIGS. 5A and 5B can be exploited for offset compensation of the transconductance loop.

FIG. 6 shows the switches involved in measuring the (at least) two offset values during the calibration procedure (namely, the switches Sw1, Sw2, Sw3, Sw4 to be operated as described previously in connection with FIGS. 5A and 5B) and the circuits (namely the elements indicated by the reference numerals 18, 20, 22A, 22B, 22C) used to dynamically compensate the offset during the normal VCM driving activity—e.g., tracking—as represented in FIG. 6.

Again, the switches Sw1, Sw2, Sw3, Sw4 can be implemented in a manner known per se to those of skill in the art, e.g., as a MOSFET transistors and can be operated (turned on=conductive and off=non-conductive) under the control of the controller MCU, for instance.

It is noted that in FIG. 6 the switches Sw1, Sw2, Sw3, Sw4 are illustrated in the condition used for normal VCM activity (that is after calibration/calculation of the offset v. supply voltage characteristic curve).

As illustrated in FIG. 6, the input value to the DAC converter 14 is provided by the summation node 18, namely as the input word DW "compensated" by the dynamic offset compensation value ([X:0]) 20A that is obtained in an offset computation block 20.

The block 20 receives as inputs the two offset values ([X:0]) calculated during calibration with the two common-mode voltages used for the double offset measurement, e.g., Vm/2=VM/2 and Vm=VM.

In various embodiments the block 20 may not be configured to calculate these values per se, but rather to receive these two offset values that are calculated as discussed previously during the offset calibration phase: this can be done, e.g., via the (possibly external) microcontroller MCU usually associated with the hard disk drive HDD (see also the flow chart presented in FIG. 8).

The block 20 processes these two values to obtain, e.g., in real-time, an offset value to be applied to the loop during normal operation of the VCM.

As discussed, offset calculation can take place—e.g., in the controller MCU, in a manner known per se to those of skill in the art—based on the same criteria used to calculate a (single) offset value in the conventional calibration procedure discussed in connection with FIG. 4.

In the exemplary solution presented herein that calculation takes place twice, namely with the common-mode voltages at the input of the sense amplifier set at, e.g., Vm/2=VM/2 and Vm=VM.

The block 20 uses the two offset values received to find a correct offset 20A to be summed (at the node 18) to the DAC input word DW in order to produce an $I_{VCM}$ v. DW characteristic as close as possible to that shown in FIG. 2 independently by the VM voltage.

In that way a dynamic offset characteristic as portrayed in FIG. 7 can be obtained—starting from two measurement points indicated as I (Vm/2=VM/2) and II (Vm=VM): FIG. 7 that portrays a possible behavior of a loop offset compensation value (e.g., in terms of DAC word DW—decimal) versus the value for VM.

The value for VM measured through a "VM ADC" converter 22C (e.g., [X:0]) can be supplied to the DAC offset computation block 20. The DAC offset computation block 20 will thus provide an adequate offset compensation value according to the "instantaneous" value of VM even if this value varies, e.g., within an HDD operating voltage range, e.g., between about 10 and 14 Volt.

A desired dynamic offset compensation resolution can be achieved according to an application specification (e.g., in terms of VM ADC bit resolution).

The flow chart in FIG. 8 is exemplary of a possible implementation of:

An offset calibration (measurement) procedure as discussed in the foregoing (left-hand side of FIG. 8), and An offset compensation procedure during normal operation of the HDD power combo (right-hand side of FIG. 8).

Switching between the two involves controlling the switches Sw1, Sw2, Sw3, and Sw4.

An offset calibration and compensation procedures as discussed herein can be activated in a power combo as repeatedly discussed herein in order to reduce (notionally cancel) the VCM current control loop offset.

That calibration routine can be performed, e.g., in response to a command from the HDD controller, for instance before tracking operation of the heads is started or whenever held advantageous under the control of the controller MCU.

After a START (command/event) as illustrated on the left-hand side of FIG. 8 in steps as represented by blocks 1000 and 1002 in FIG. 8, the transconductance loop is operated first in the condition represented in FIG. 5A (e.g., Vm/2=VM/2) and then in the condition represented in FIG. 5B (e.g., Vm=VM) to produce (at least) two offset measurement points (e.g., I and II in FIG. 7).

In a step as represented by block 1004 in FIG. 8 a (linear) characteristic as illustrated in FIG. 7 can be determined (calculated) starting from these points. Such a characteristic lends itself to being stored, e.g., as a look-up table to the DAC offset computation block 20 or to being calculated based on a function that links the common mode voltage to a related offset.

Once such an offset calibration procedure completed, in a step as represented by block 1006 on the right-hand side of FIG. 8, a current value for VM (that is Vm) is measured (e.g., through the VM ADC converter 22C) and supplied to the DAC offset computation block 20.

In a step as represented by block 1008 in FIG. 8, the DAC offset computation block 20 is thus in a position to provide an adequate offset compensation value according to the instantaneous value of VM even if this value varies within an HDD operating voltage range.

FIG. 8 is not otherwise to be construed as implying by way of necessity a one-to-one relationship between offset calibration procedure and normal operation of the HDD: in fact, offset compensation can be activated with a high refresh rate when controlling a VCM.

FIGS. 9A and 9B show the effects, in terms of current in the load (assuming a constant value for the DAC input word DW is applied) of possible variations of the voltage VM:

in the case of a conventional arrangement (FIG. 4 and FIG. 9A), and in the case of an arrangement using dynamic compensation as discussed herein (FIGS. 5A, 5B, 6, 7, and 8 and FIG. 9B).

The curves in FIGS. 9A and 9B are exemplary of possible time behaviors of the following signals (from top to bottom):

the supply voltage VM, the drive voltage on line VCMP, the drive voltage on line VCMN, the current $I_{CM}$.

The lowest curves show the effects, in terms of current in the load, of the variation of the voltage Vm in the case of a conventional arrangement (FIG. 9A), and in the case of an arrangement using dynamic compensation as discussed herein (FIG. 9B).

In these figures the desired current value is constant (the DAC Word DW is assumed to be constant).

Due to variation of offset, the current in the load is not constant in the case of a conventional arrangement as portrayed in FIG. 9A.

Conversely, in an arrangement using dynamic compensation as discussed herein the current is substantially constant as portrayed in FIG. 9B.

Of course, the time behaviors indicated/shown in FIGS. 9A and 9B are purely indicative and non-limiting.

Without prejudice to the underlying principles, the details and embodiments may vary, even significantly, with respect to what has been described in the foregoing, by way of example only, without departing from the extent of protection.

The extent of protection is determined by the annexed claims.

What is claimed is:

1. A method of operating a voice coil motor via a transconductance loop, the method comprising:

detecting an actual value of a supply voltage of the transconductance loop;

producing an offset compensation signal of the transconductance loop as a function of the detected actual value of the supply voltage based on a relationship between offset values and the supply voltage of the transconductance loop;

applying the offset compensation signal to a loop control signal of the transconductance loop, wherein a target drive current for the voice coil motor is based on the loop control signal; and applying a drive current to the voice coil motor, the drive current related to the target drive current.

2. The method of claim 1, wherein the offset values comprise a first offset value that produces a commutation in a sign of an error signal at an output of an error amplifier of the transconductance loop in a first calibration condition, and a second offset value that produces a commutation in the sign of the error signal at the output of the error amplifier in a second calibration condition.

3. The method of claim 2, wherein the drive current is applied by a power stage of the transconductance loop, the method further comprising at least partially de-activating the power stage to discontinue supplying drive current to the voice coil motor during the first calibration condition and the second calibration condition.

4. The method of claim 2, wherein the relationship between the offset values and the supply voltage of the transconductance loop is a straight line passing through the first offset value and the second offset value.

5. The method of claim 2, wherein producing the offset compensation signal of the transconductance loop comprises reading the offset compensation signal in a look-up table having stored therein the relationship between the offset values and the supply voltage of the transconductance loop and having entries for the detected actual value of the supply voltage.

6. The method of claim 2, wherein producing the offset compensation signal of the transconductance loop comprises calculating a relationship between the first offset value and the second offset value and first and second common input voltages applied to first and second inputs of a sense amplifier of the transconductance loop.

7. A transconductance loop circuit configured to operate with the method of claim 1, the transconductance loop comprising:
a power stage configured to apply a drive current to the voice coil motor;
a differential sense amplifier having first and second inputs configured to be coupled to a current sensor of the voice coil motor, wherein the differential sense amplifier is configured to produce a sense signal indicative of the drive current applied to the voice coil motor; and
an error amplifier configured to receive the loop control signal to produce the target drive current for the voice coil motor, wherein the error amplifier is coupled to the power stage to drive the power stage based on the loop control signal and the sense signal.

8. A method of operating a voice coil motor in a hard disk drive via a transconductance loop having a supply voltage, wherein the transconductance loop comprises a power stage configured to apply a drive current to the voice coil motor, a differential sense amplifier having first and second inputs coupled to a current sensor of the voice coil motor, wherein the differential sense amplifier is configured to produce a sense signal indicative of the drive current applied to the voice coil motor, and the transconductance loop comprises an error amplifier configured to receive a loop control signal to produce a target drive current for the voice coil motor, wherein the error amplifier is coupled to the power stage to drive the power stage based on the loop control signal and the sense signal, wherein the method comprises:
performing a calibration with a first calibration condition and a second calibration condition of the transconductance loop wherein, in the first calibration condition, the first and second inputs of the differential sense amplifier have applied thereto a first common input voltage and the error amplifier has applied thereto said loop control signal with a first offset value that produces a commutation in a sign of an error signal at an output of the error amplifier in the first calibration condition, and, in the second calibration condition, the first and second inputs of the differential sense amplifier have applied thereto a second common input voltage and the error amplifier has applied thereto said loop control signal with a second offset value that produces a commutation in the sign of the error signal at the output of the error amplifier in the second calibration condition, wherein the second common input voltage is different from the first common input voltage and at least one of the first and second common input voltages is a function of the supply voltage of the transconductance loop;
establishing, based on the first offset value and the second offset value, a relationship between offset values and supply voltage of the transconductance loop;
detecting an actual value of the supply voltage of the transconductance loop;
producing an offset compensation signal of the transconductance loop as a function of the detected actual value of the supply voltage based on the relationship between the offset values and the supply voltage of the transconductance loop; and
applying to the loop control signal of the transconductance loop the offset compensation signal.

9. The method of claim 8, wherein both of the first and second common input voltages applied to the first and second inputs of the differential sense amplifier are a function of the supply voltage of the transconductance loop.

10. The method of claim 8, comprising at least partially de-activating the power stage to discontinue supplying drive current to the voice coil motor during the first calibration condition and the second calibration condition.

11. The method of claim 8, wherein the relationship between offset values and the supply voltage of the transconductance loop is a straight line passing through the first offset value and the second offset value.

12. The method of claim 8, further comprising producing the offset compensation signal of the transconductance loop by reading it in a look-up table having stored therein said relationship between offset values and the supply voltage of the transconductance loop and having entries for the detected actual value of the supply voltage.

13. The method of claim 8, further comprising producing the offset compensation signal of the transconductance loop by calculating a relationship between the first offset value and the second offset value and the first and second common input voltages applied to the first and second inputs of the differential sense amplifier.

14. A transconductance loop circuit comprising:
a power stage configured to apply a drive current to a voice coil motor in a hard disk drive;
a differential sense amplifier having first and second inputs configured to be coupled to a current sensor of the voice coil motor, wherein the differential sense amplifier is configured to produce a sense signal indicative of the drive current applied to the voice coil motor;

an error amplifier configured to receive a loop control signal to produce a target drive current for the voice coil motor, wherein the error amplifier is coupled to the power stage to drive the power stage based on the loop control signal and the sense signal;

offset calibration circuitry configured to be brought to a first calibration condition and a second calibration condition and to establish a relationship between offset values and a supply voltage of the transconductance loop circuit, based on a first offset value and a second offset value;

a detector configured to detect an actual value of the supply voltage;

a processing circuit configured to produce an offset compensation signal of the transconductance loop circuit as a function of the detected actual value of the supply voltage based on the relationship between the offset values and the supply voltage of the transconductance loop circuit; and an offset compensation node configured to apply the offset compensation signal to the loop control signal of the transconductance loop circuit.

15. The transconductance loop circuit of claim 14, wherein the power stage is configured to be at least partially de-activated to discontinue supplying drive current to the voice coil motor during the first calibration condition and the second calibration condition.

16. The transconductance loop circuit of claim 14, wherein the processing circuit is configured to produce the offset compensation signal of the transconductance loop circuit by reading it in a look-up table having stored therein said relationship between the offset values and the supply voltage of the transconductance loop circuit and having entries for the detected actual value of the supply voltage.

17. The transconductance loop circuit of claim 14, wherein the processing circuit is configured to produce the offset compensation signal of the transconductance loop circuit by calculating a relationship between the first offset value and the second offset value and first and second common input voltages applied to the first and second inputs of the differential sense amplifier.

18. A power combo integrated circuit for use with a hard disk drive that includes a hard disk, a spindle motor, and a voice coil motor, the power combo integrated circuit comprising:
the transconductance loop circuit according to claim 14; and
a spindle motor driver;
wherein the power combo integrated circuit is configured to operate with the hard disk drive such that the spindle motor driver drives the spindle motor to cause the hard disk to spin and the transconductance loop circuit drives the voice coil motor to position a read/write head at a surface of the hard disk.

19. A hard disk drive, comprising:
a hard disk;
a voice coil motor functionally coupled to the hard disk; and
the transconductance loop circuit according to claim 14, wherein the power stage is coupled to the voice coil motor to apply the drive current to the voice coil motor.

20. The hard disk drive of claim 19, further comprising:
a spindle motor functionally coupled to the hard disk to cause the hard disk to spin, wherein the voice coil motor is functionally coupled to the hard disk to position a read/write head at a surface of the hard disk; and
a spindle motor driver coupled to the spindle motor to apply a spindle motor drive current to the spindle motor.

* * * * *